Aug. 4, 1931.   N. J. POUX   1,817,839
SEPARABLE FASTENER
Filed Sept. 16, 1929   2 Sheets-Sheet 1
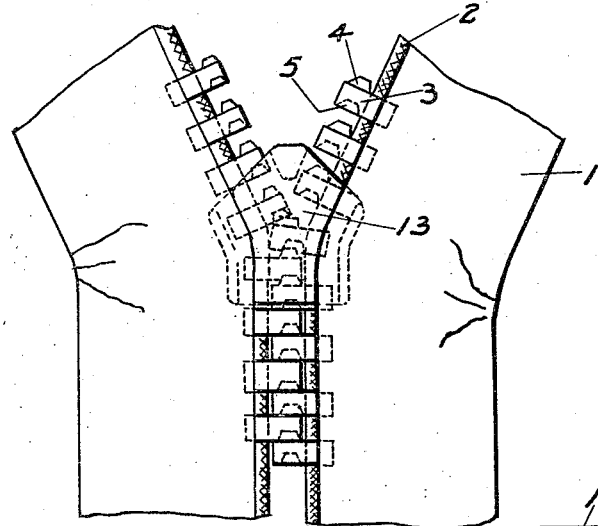
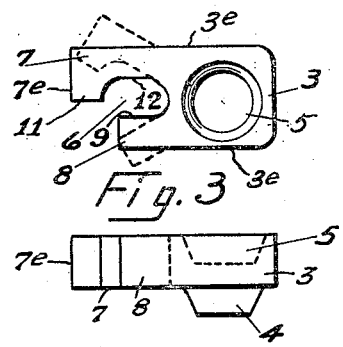
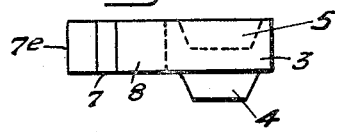
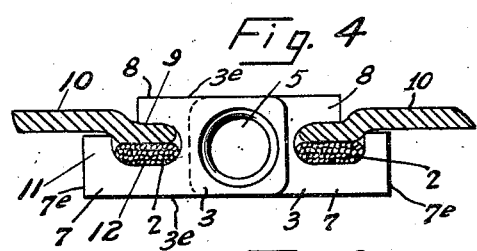
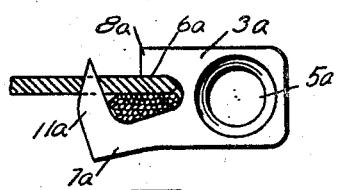
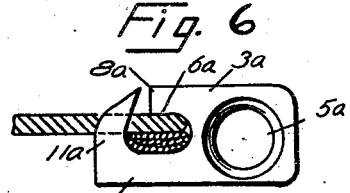
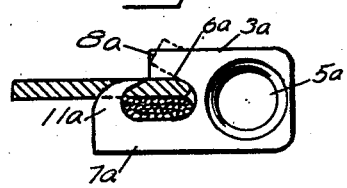
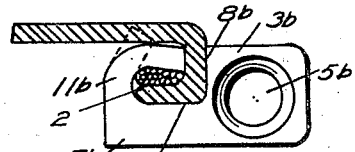
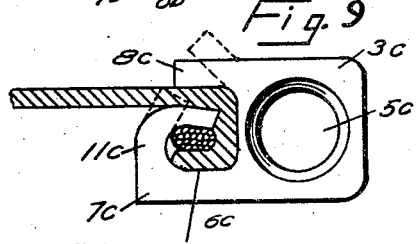
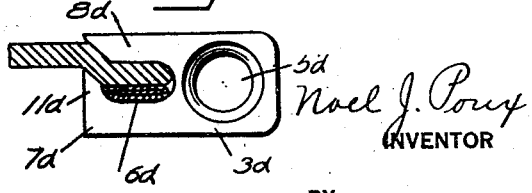
Noel J. Poux
INVENTOR
BY
ATTORNEY

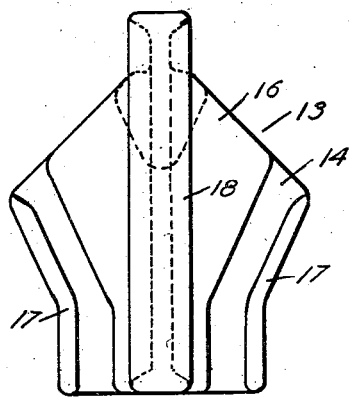
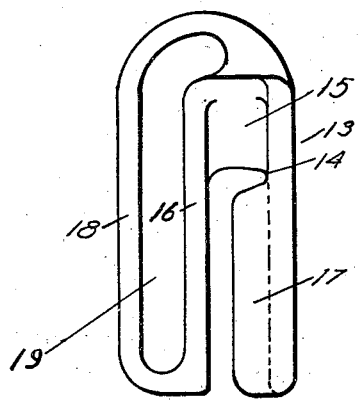
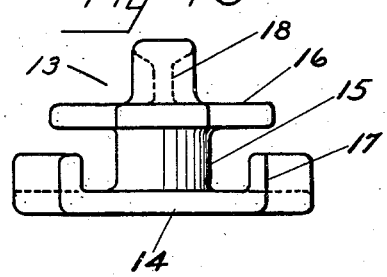
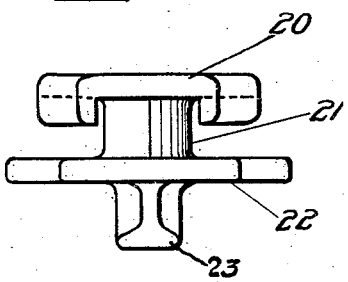
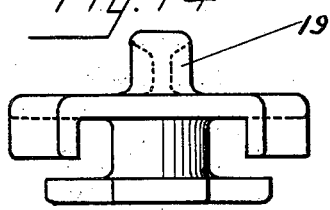
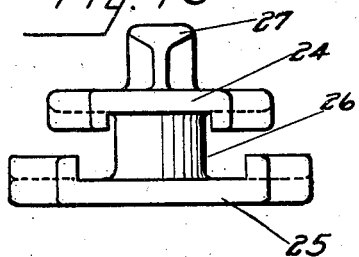

Patented Aug. 4, 1931

1,817,839

UNITED STATES PATENT OFFICE

NOEL J. POUX, OF MEADVILLE, PENNSYLVANIA, ASSIGNOR TO LION FASTENER INC., OF MEADVILLE, PENNSYLVANIA, A CORPORATION OF DELAWARE

SEPARABLE FASTENER

Application filed September 16, 1929. Serial No. 392,785.

It is desirable with separable fasteners in many relations to have as little of the operating elements of the fastener exposed as possible. The present invention is designed to improve the fastener along this line. It is also desirable to reduce the size and projection of the confining plate of the slider operating on the fastener and the present invention is designed to accomplish this purpose. Further features and details of the invention will appear from the specification and claims.

Preferred embodiments of the invention are illustrated in the accompanying drawings as follows:—

Fig. 1 shows a separable fastener with the slider in place thereon.

Fig. 2 an enlarged elevation of one of the fastening members.

Fig. 3 a plan view of the same.

Fig. 4 an enlarged elevation of the members with the stringers in section.

Figs. 5, 6 and 7 elevations of a modified interlocking member.

Figs. 8 and 9 elevations of other modifications.

Fig. 10 an elevation of a further modification.

Fig. 11 a plan view of the slider.

Fig. 12 a side elevation of the same.

Fig. 13 an end view of the same.

Fig. 14 a modification of the slider.

Fig. 15 a further modification.

Fig. 16 another modification.

In the form of the invention shown in Figs. 1 to 4 inclusive, 1 marks the stringers. These are provided with ribs 2. The ribs are preferably off-set, that is to say, as shown each rib is formed at one side only of the stringer.

Interlocking, or fastener members 3 are provided with interlocking projections 4 and cavities 5 receiving these projections. The members are each provided with an opening 6 which is designed to receive the rib. A jaw 7 operates on one side of the opening and a jaw 8 on the opposite side. The rib is placed in the opening and the jaws closed. The jaw 8 is shorter than the jaw 7 being preferably of less length than the recess 6. The inner surface 9 of this jaw is off-set slightly from the plane 10 of the same side of the stringer and the jaw 7 is provided with the projection 11 engaging the rear of the rib and also deflecting the free portion of the stringer toward the opposite edge of the fastener thus making the engagement somewhat more effective and at the same time reducing the exposure of the narrow part of the fastening members. As the jaws 7 and 8 are closed from either initial dotted position, as shown in Fig. 2, the rib is clamped between the surface 9 of the short jaw and the surface 12 on the jaw 7.

The interlocking members project from the edges of the stringers and the free part of each of the stringers, that is, the part of the stringer outside of the clamps is off-set relatively to the edges 3e of its interlocking members. Thus there is less projection of the interlocking members from the face of the stringer toward one edge of the members than from the face of the stringer toward the opposite edges of the members and the side having the lesser projection is consequently made less conspicuous and offers less obstruction. It will also be noted that the exposed edges of the interlocked fasteners form very well-defined strips along the opposite faces of the stringers, said strips being usually contrasted in color from the stringers themselves and that the strip on the side having the jaws 8 is very materially narrower than that on the side having the jaws 7. This feature supplementing the lesser projection of the jaws 8 also tends to make this side of the fastener as inconspicuous as possible. On the other hand the jaw 7 is of sufficient length to properly engage the rib of the stringer and the projection 11 is closed back of the rib, thus positively locking the fastener to the stringer. Also the shoulder formed by the outer ends 7e of the jaws 7 give ample engagement to the guiding means of an attached slider so that notwithstanding the small projection of the jaws 8 there is an assured guiding action of the slider through the greater contact on the ends 7e of the jaws 7. This greater depth of shoulder at the ends 7e of the jaws 7 makes it possible also to provide a slider with guiding flanges only at the side engaging the ends 7e.

In Figs. 5, 6 and 7 I show a modification. The interlocking members 3a have cavities 5a with corresponding projections (not shown) similar to the cavities 5 and projections 4, and a rib-receiving recess 6a. The jaw 7a has an upturned end 11a which is pointed so as to penetrate the material. This pointed end is bent downwardly preferably to a point under the end of the jaw 8a, as clearly shown in Fig. 7. This is brought about by first bending the jaw 11a to the position shown in Fig. 7 and then bending down the jaw 8a.

In Fig. 8 I show another modification in which the interlocking member 3b has the cavity 5b with a projection (not shown) similar to the projection 4. It is provided with a recess 6b receiving the ribbed end. The jaw 7b has the elongated upturned portion 11b which is bent over the rib 2, thus making a restricted space between the end of the projection 11b and the shoulder 8b on the member. Thus the ribbed edge is securely locked in place and the material is given a definite rearward turn.

In Fig. 9 a modification is shown in which the member 3c has the recess 5c and a projection (not shown) corresponding to the projection 4. The recess 6c receives the rib and the jaw 7c has the projection 11c which is bent inwardly over the rib. The short jaw 8c is bent downwardly over the return bend of the stringer and thus securely locks it in place.

In Fig. 10 the modification has a member 3d with a recess 5d and a projection (not shown) corresponding to the projection 4. It is provided with a recess 6d for receiving the ribbed edge of the stringer. The long jaw 7d has an upward extension 11d terminating in a beveled end. The short jaw 8d has a beveled end paralleling the end of the projection 11d. This gives to the stringer back of the rib a slight bend and consequently assists in securing the stringer to the member.

A slider 13 (See Figs. 11, 12 and 13) has a confining plate 14, a spreader 15 and a plate 16, the spreader connecting these plates. The plate 14 is provided with closing flanges 17 of usual form except that the flanges are somewhat deeper than the ordinary flanges and engage the ends 7e of the jaws 7 of the fastener members. The plate 16 is flat and narrower than the bottom plate 14. By making the upper plate 16 flat the jaws engaging this upper plate are perfectly free to move and accommodate themselves in and out as they are guided by the guide flange 17. Thus friction is very much reduced. The plate 16 is also much narrower than the lower plate 14. This is made practical because the guiding ends of the members having the greater off-set are engaged for spreading and closing the members so that all that the opposite or narrower side of the slider has to do is to retain the members between the plates and in as much as the upper jaws 8 are comparatively short the spreader plate can, to advantage, be made correspondingly narrow.

A lug 18 is provided for fastening the usual pull attachment (not shown). This lug has its depression 19 for receiving the jaws of the pull attachment and this lug operates as a web to strengthen the plate 16. This is of importance with relation to the plate 16 in that the plate 16 is not provided with the usual strengthening guiding flanges.

In the structure shown in Fig. 14 the parts are similar to those shown in Fig. 13 except that a fastening pull attaching lug 19 is arranged on the plate having the closing flanges.

In Fig. 15 a plate 20, which is the narrower plate, is provided with the closing flanges and a spreader 21 joins this plate with a flat plate 22. A tab fastening lug 23 is secured to the flat plate 22.

In the structure shown in Fig. 16 both plates 24 and 25 are provided with closing flanges, the plate 24 being narrower than the plate 25. These plates are connected by a spreader 26 and a tab fastening lug 27 is secured on the plate 24.

What I claim as new is:—

1. A separable fastener comprising stringers; interlocking members secured to the stringers, the strips formed on the faces of the stringers by said members in interlocking relation being narrower at one side of the stringers than the other, and a slider having confining plates connected by a separator between which the members pass, the plate engaging the narrower strip formed by said members being narrower than the opposing plate.

2. A separable fastener comprising stringers; interlocking members secured to the stringers, the strips formed on the faces of the stringers by said members in interlocking relation being narrower at one side of the stringers than the other, and a slider having confining plates connected by a separator between which the members pass, the plate engaging the narrower strip formed by said members being narrower than the opposing plate and the plate at the broader side of the members having closing flanges.

3. A separable fastener comprising stringers; interlocking members secured to the stringers, the strips formed on the faces of the stringers by said members in interlocking relation being narrower at one side of the stringers than the other, and a slider having confining plates connected by a separator between which the members pass, the plate engaging the narrower strip formed by said members being narrower than the opposing plate and the plate at the broader side of the members only having closing flanges.

4. A separable fastener comprising stringers, interlocking members secured to the stringers, said members having jaws clamping the edges of the stringers, the jaws at one side of the stringers being shorter than the jaws at the opposite side, and a slider having confining plates connected by a separator between which the members pass, the plate at the side of the stringers having the greater length of jaws having closing flanges.

5. A separable fastener comprising stringers, interlocking members secured to the stringers, said members having jaws clamping the edges of the stringers, the jaws at one side of the stringers being shorter than the jaws at the opposite side, and a slider having confining plates connected by a separator between which the members pass, the plate at the side of the stringers having the greater length of jaws having closing flanges and the plate at the side of the fastener having the shorter jaws being narrower than the opposing plate.

6. A separable fastener comprising a pair of stringers; and a series of members on each stringer arranged to interlock with the members on the other stringer, the members being shaped to form, when interlocked, strips at each side of the fastener along the meeting edges of the stringers, the strip at one side being comparatively inconspicuous and narrower than the strip at the other side of the fastener.

7. A separable fastener comprising a pair of stringers; and a series of members on each stringer arranged to interlock with the members on the other stringer, the members being shaped to form, when interlocked, strips at each side of the fastener along the meeting edges of the stringers, the strip at one side being comparatively inconspicuous and narrower than the strip at the other side of the fastener, said members being provided with jaws clamping the edges of the stringers, one jaw of each member being shorter than the other and the longer jaw being of sufficient length to form with the shorter jaw a positive clamp on the stringer.

8. A separable fastener comprising a pair of stringers, each stringer being provided with an off-set rib along its edge; and a series of members on each stringer arranged to interlock with the members on the other stringer, the members being shaped to form, when interlocked, strips at each side of the fastener along the meeting edges of the stringers, the strip at one side being comparatively inconspicuous and narrower than the strip at the other side of the fastener.

9. A separable fastener comprising a pair of stringers, each stringer being provided with an off-set rib along its edge; and a series of members on each stringer arranged to interlock with the members on the other stringer, the members being shaped to form, when interlocked, strips at each side of the fastener along the meeting edges of the stringers, the strip at one side being comparatively inconspicuous and narrower than the strip at the other side of the fastener, said members being provided with jaws clamping the edges of the stringers, one jaw of each member being shorter than the other and the longer jaw being of sufficient length to form with the shorter jaw a positive clamp on the rib of the stringer.

10. A separable fastener comprising stringers; interlocking members secured to the stringers; and a slider having confining plates between which the members pass, said plates being connected at one end, one of the plates only being provided with closing flanges and the opposite plate being flat and provided with a pull fastener lug extending from the connection between the plates and along said flat plate toward the free end thereof forming a strengthening web for the flat plate.

11. A separable fastener comprising stringers; and interlocking members secured to the stringers, the interlocking members projecting from the edges of the stringers and the free part of each stringer being off-set relatively to the edges of its interlocking members.

12. A separable fastener comprising stringers; and interlocking members secured to said stringers, said interlocking members projecting from the edges of the stringers and the free part of each stringer being off-set relatively to the edges of its interlocking members, said interlocking members having jaws clamping the edges of the stringers.

13. A separable fastener comprising stringers; and interlocking members secured to the stringers, the interlocking members projecting from the edges of the stringers and the free part of each stringer being off-set relatively to the edges of its interlocking members, said members having jaws clamping the edges of the stringers, the jaws at one side of each stringer being shorter than the jaws at the opposite side.

14. A separable fastener comprising stringers with off-set ribs along their edges; and interlocking members secured to the stringers, the interlocking members projecting from the edges of the stringers and the free part of each stringer being off-set relatively to the edges of its interlocking member.

15. A separable fastener comprising stringers with off-set ribs along their edges; and interlocking members secured to the stringers, the interlocking members projecting from the edges of the stringers and the free part of each stringer being off-set relatively to the edges of the interlocking members, the members being shaped to form, when interlocked, strips at each side of the fastener along the meeting edges of the stringers, the strips at one side being comparatively inconspicuous and narrower than the strips at the other side of the fastener.

16. A separable fastener comprising stringers with off-set ribs along their edges; and interlocking members secured to the stringers, the interlocking members projecting from the edges of the stringers and the free part of each stringer being off-set relatively to the edges of its interlocking members, said members having jaws clamping said ribs, said jaws being shorter at one side of the stringer than at the opposite side.

17. A separable fastener comprising stringers; interlocking members secured to the stringers, the interlocking members projecting from the edges of the stringers and the free part of each stringer being off-set relatively to the edges of its interlocking members; and a slider having confining plates connected by a separator between which the members pass, the plate on the side of the members having their edges the more remote from the stringers having guiding flanges.

18. A separable fastener comprising stringers; interlocking members secured to the stringers, the interlocking members projecting from the edges of the stringers and the free part of each stringer being off-set relatively to the edges of its interlocking members; and a slider having confining plates connected by a separator between which the members pass, the plate on the side of the fastener the more remote from the stringers having guiding flanges and the opposite plate being flat.

19. A separable fastener comprising stringers; interlocking members secured to the stringers, the interlocking members projecting from the edges of the stringers and the free part of each stringer being off-set relatively to the edges of its interlocking members, the members being shaped to form when interlocked strips at each side of the fastener along the meeting edges of the stringers, the strip at one side being comparatively inconspicuous and narrower than the strip at the other side of the fastener; and a slider having confining plates connected by a separator between which the members pass, the plate on the side of the fastener the more remote from the stringers having guiding flanges and the opposite plate being flat and narrower than the plate having the guiding flanges.

20. A separable fastener comprising stringers, and interlocking members secured to the stringers, the interlocking members projecting from the edges of the stringers and the free part of each stringer being off-set relatively to the edges of its interlocking members, said members having jaws clamping the edges of the stringers, the jaws at one side of the fastener being shorter than the jaws at the opposite side, the shorter jaws being at the side of the fastener toward which the free part of each stringer is offset.

21. A separable fastener comprising stringers; interlocking members secured to the stringers, the interlocking members projecting from the edges of the stringers and the free part of each stringer being off-set relatively to the edges of its interlocking members, said members having jaws clamping the edges of the stringers, the jaws at one side of the fastener being shorter than the jaws at the opposite side, the shorter jaws being at the side of the fastener toward which the free part of each stringer is offset; and a slider having confining plates connected by a separator between which the members pass, the plate on the side having the longer jaws being provided with guiding flanges.

22. A separable fastener comprising stringers; interlocking members secured to the stringers, the interlocking members projecting from the edges of the stringers and the free part of each stringer being off-set relatively to the edges of its interlocking members, said members having jaws clamping the edges of the stringers, the jaws at one side of the fastener being shorter than the jaws at the opposite side, the shorter jaws being at the side of the fastener toward which the free part of each stringer is offset; and a slider having confining plates connected by a separator between which the members pass, the plate on the side having the longer jaws being provided with guiding flanges and the opposite plate being flat.

23. A separable fastener comprising stringers; interlocking members secured to the stringers, the interlocking members projecting from the edges of the stringers and the free part of each stringer being off-set relatively to the edges of its interlocking members, said members having jaws clamping the edges of the stringers, the jaws at one side of the fastener being shorter than the jaws at the opposite side, the shorter jaws being at the side of the fastener toward which the free part of each stringer is offset, and a slider having confining plates connected by a separator between which the members pass, the plate on the side having the longer jaws being provided with guiding flanges and the opposite plate being flat and narrower than the plate having the guiding flanges.

24. A separable fastener comprising stringers with off-set ribs along their edges; interlocking members secured to the stringers, the interlocking members projecting from the edges of the stringers and the free part of each stringer being off-set relatively to the edges of its interlocking member and away from the side of the fastener having the ribs and a slider having confining plates between which the members pass, the plate on the side of the fastener the more remote from the free part of each stringer being provided with guiding flanges and the opposite plate being flat and permitting free lateral movement of the members thereon.

25. A separable fastener comprising a stringer having a textile web, said web having only one rib on one side along one edge, said rib being off-set toward the side on which it is placed; and fastener members having jaws each member having an off-set recess for receiving said rib, said jaws clamping the edge of the stringer including the rib between them.

In testimony whereof I have hereunto set my hand.

NOEL J. POUX.